Figure 1:
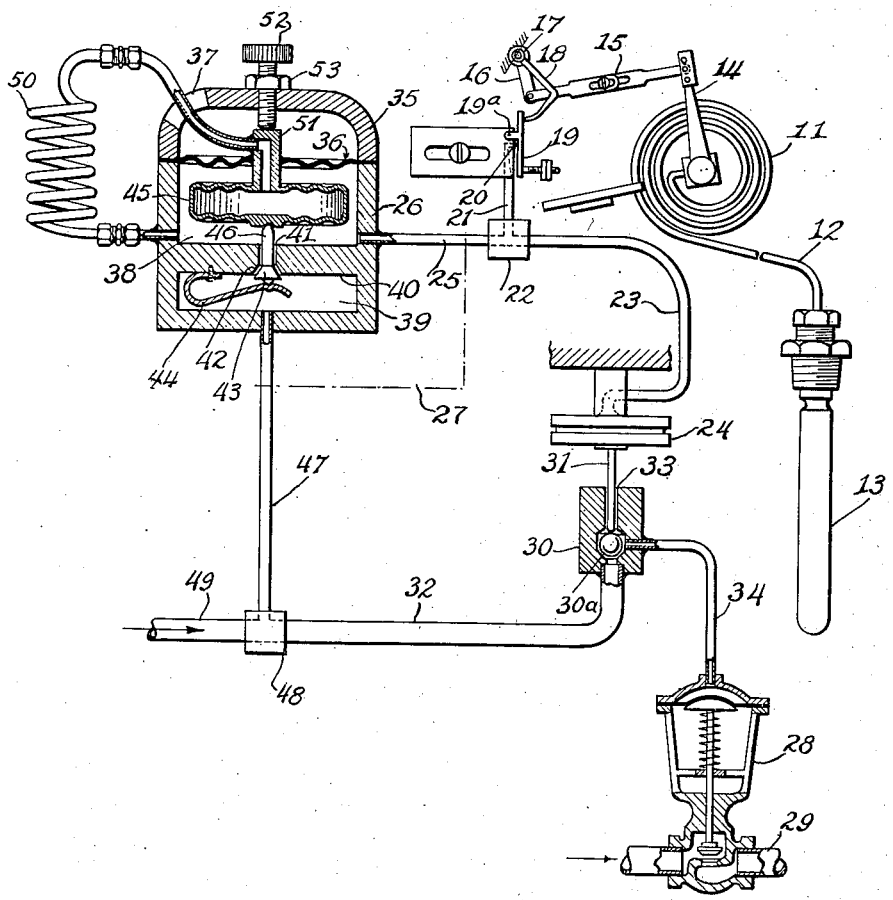

Nov. 25, 1941.     P. F. K. ERBGUTH     2,264,261
DAMPED REGULATOR
Filed Oct. 23, 1937     3 Sheets-Sheet 1

WITNESS
Ed. S. Smith, Jr.

INVENTOR
Paul F. K. Erbguth
BY
Briesen Schrenk
ATTORNEYS

Nov. 25, 1941.          P. F. K. ERBGUTH                2,264,261
                         DAMPED REGULATOR
                      Filed Oct. 23, 1937           3 Sheets-Sheet 2

INVENTOR
Paul F. K. Erbguth

WITNESS
Ed S. Smith, Jr.

BY
ATTORNEYS

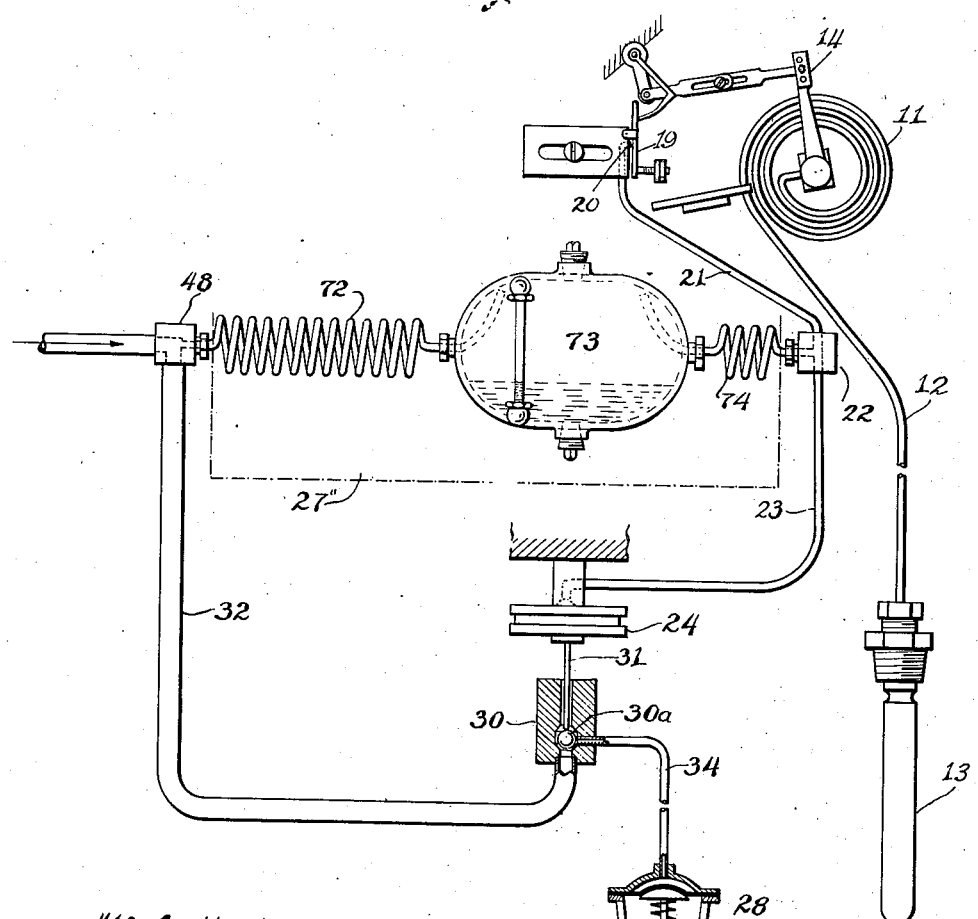
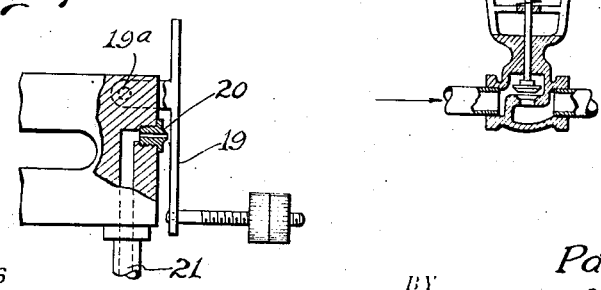

Patented Nov. 25, 1941

2,264,261

UNITED STATES PATENT OFFICE 2,264,261

DAMPED REGULATOR

Paul F. K. Erbguth, Brooklyn, N. Y., assignor to Charles J. Tagliabue Mfg. Co., Brooklyn, N. Y., a corporation of New York Application October 23, 1937, Serial No. 170,664

20 Claims. (Cl. 236—82)

The present invention relates to methods of and means for automatically maintaining a physical variable at a predetermined or selected value.

It is the primary object of the invention to provide a simple and efficient regulator which will maintain a selected value of temperature, pressure, level, flow or other physical variable substantially constant over indefinite periods of time in an apparatus or process under regulation.

In one form of the invention, the regulator is employed to govern the opening of a valve which controls the flow of a fluid to or from the apparatus under regulation and operates to closely maintain, without hunting, a predetermined value of temperature, pressure, level, or flow, etc. therein in spite of the fact that changing conditions may require widely different degrees of opening of the control valve.

Although, as indicated, my improved regulator is suitable for the regulation of physical variables of different kinds, it finds its greatest utility at the present time in connection with the control of temperature and will accordingly be further described, by way of example, as embodied in a temperature regulating mechanism.

Since in different branches of the art of regulation, the words "regulate," "control" and "govern" are overlappingly used, the terms of the following definition are applied throughout the specification and claims where any question of ambiguity might otherwise arise, although the several words are used interchangeably in some instances where their meaning is general instead of specific:

A regulator for an independent physical variable comprises a metering means responsive to the variable, means for controlling either the metered variable or for another which affects it, and governing means operatively connecting the metering and controlling means to cause the controlling means to act to regulate the metered variable in a predetermined manner.

In brief, the present invention relates to improvements in the governing means of a throttling regulator of the "corresponding" type, loosely referred to as "proportional," in which the position of the controlling means ultimately corresponds with the value of the metered variable, i. e. the regulation is not to a set point but is over a "throttling range." An increase of sensitivity of response of regulator action to a change of the regulated variable reduces the width of the throttling range but tends to make any regulator unstable in its action, sensitivity being the ratio of effect to cause, i. e., the change of the regulated variable per unit change of a variable set at the meter for the meter to match.

The governing means of the present invention acts to momentarily destroy such necessary ultimate high-sensitivity response by dampingly providing an initial low-sensitivity response with such a gradual restoration of the high-sensitivity response, following a sudden change of the metered variable, that the process lag between the controlling action and the resultant response of the meter following a movement of the controller does not set up a hunt. In other words, the improved governing means of any of the embodiments disclosed herein operates to damp out any such changes of response and thus increase the stability of the regulator.

"Damping," as used herein, means an effect which is a function of a rate, e. g. in the fluid-type governing systems described below "damping" is the friction due to the flow of the fluid in such systems, such friction being substantially proportional to the rate of such flow. Magnetic damping may similarly be employed. Damping is distinguished from mechanical friction which is objectionable, as causing hunting, in pilot-type regulators. Where a regulator functions only upon a departure of the regulated variable from the set rate, the regulator always acts too late, as after a hunt of the regulated variable has already been set up. However, in the present invention in which the regulation depends both upon the departure and the rate of departure, the regulator acts as soon as the meter starts to move and before any serious departure occurs and consequently catches the change before it is too late, after which the small departure, coupled with the damping action, gradually brings the variable nearly back to the set point.

In each of the embodiments of the present invention, a fluid-type governing system is provided with suitable damping means. In the preferred embodiment of this invention, the fluid-type governing system, including such damping means, is of a sensitiveness and simplicity heretofore unapproached, there being no mechanical moving part but pure damping only. Furthermore, such damping depends only upon the pressure in the fluid-type governing system, a fact which permits the use of the simplest possible nozzle-and-flapper for initiating the pressure changes and a controller which functions simply in correspondence with the pressure in the governing system, in a most advantageous mode of highly sensitive and stable regulation. The provision of this unique combination of damping means in the fluid-type governing system of such a regulator is thus a main object of the present invention.

A specific object of the invention is to provide an improved air-operated governing system having a damping device which has no moving parts and yet functions to govern a controller to give a mode of regulation which is dependent both upon the departure and the rate of departure of the regulated variable from its set point. A further specific object of the invention is to provide such a governing system in combination with an air-operated diaphragm-actuated control valve.

Another object of the present invention is to provide such a regulator with a fluid-type governing system in which any hunting tendency is substantially eliminated with the aid of a pressure-responsive means therein consisting of only a single damping element, which may be entirely separate from the means initially setting up pressure changes in the governing system.

These and other objects of my invention will appear to those skilled in the art from the accompanying drawings and specification, in which are illustrated and described several embodiments of the invention, it being my intention to claim all that I have disclosed which is new and useful.

Figure 2:
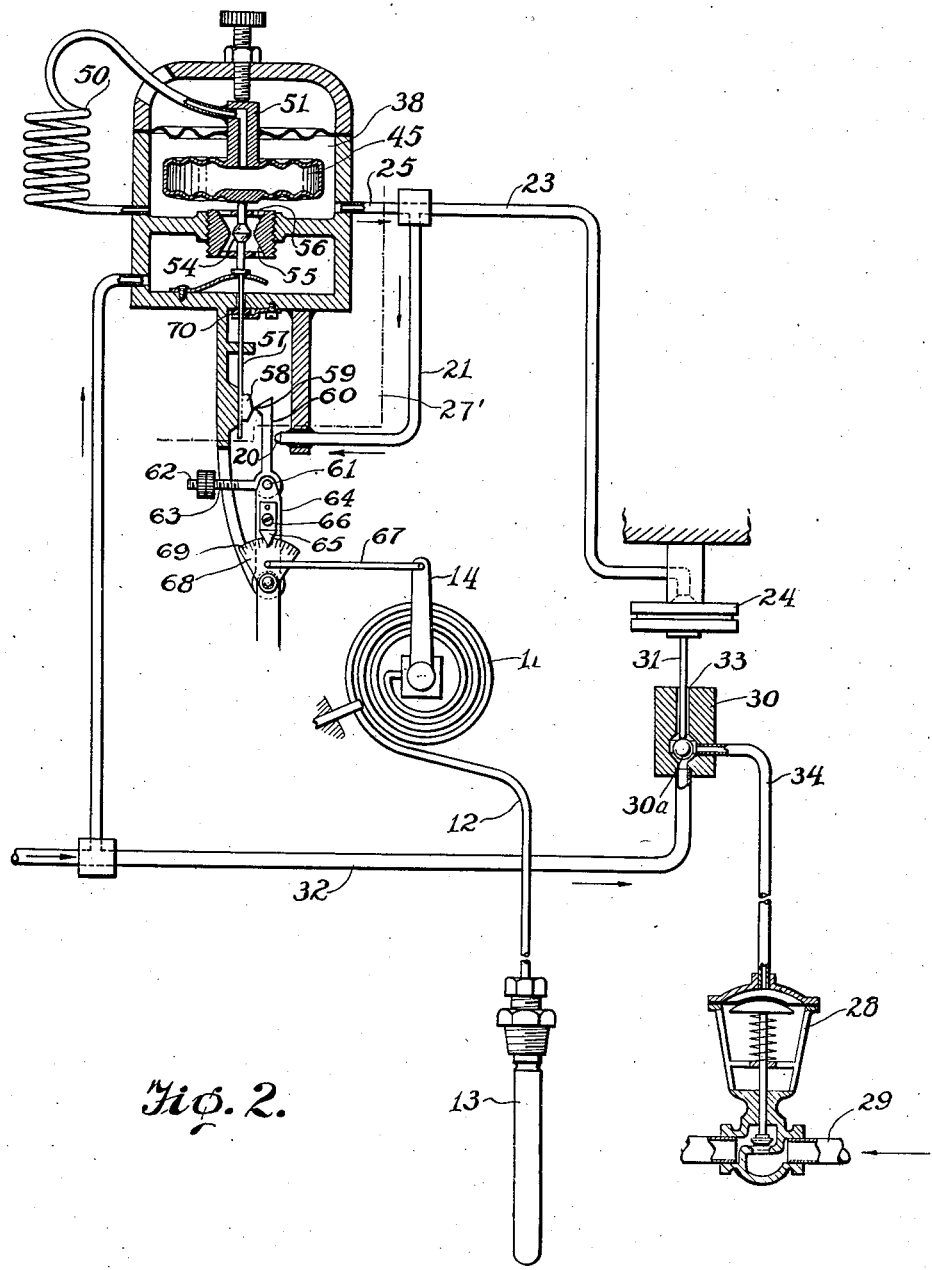

In the figures, wherein like characters indicate like parts throughout: Fig. 1 is a diagrammatic front elevation, partially in section, of one embodiment of the invention; Fig. 2 is a generally similar view of another embodiment of the invention in which there is a symmetrical action of the governing means upon a departure of the regulating variable in either direction from a steady value; Fig. 3 is a generally similar view of the preferred embodiment of the invention in which a series combination of resistances with a capacity is substituted for the single resistance, bellows and throttling valve of Figs. 1 and 2; and Fig. 4 is a front elevation, partially in section, of a detail of the leak controller of the embodiments shown in Figs. 1-3.

Figure 1

A satisfactory embodiment of the invention is illustrated in Fig. 1 by way of example. In Fig. 1 showing such a regulator, metering device 11, a Bourdon tube, is responsive to changes in a physical variable, in the present instance temperature, which is to be regulated in an apparatus under supervision. In the embodiment of the invention illustrated, this Bourdon tube 11 is connected by capillary tubing 12 to thermostatic bulb 13 which is adapted to be located at a suitable position within the apparatus under control, Bourdon tube 11 being thus responsive to fluctuations in the temperature at the bulb. It will be understood that meter 11 may be connected for response to pressure changes, or may be replaced by devices responsive to changes in other physical magnitudes, such as temperature or pressure differential, flow, level, electrical variables, etc., or it may be replaced by any other suitable mechanism. The essential characteristic of device 11 is that it produces a movement, as of lever 14, in response to, and preferably in correspondence with, fluctuations in the physical variable to be regulated.

Lever 14 is connected by adjustable link 15 with arm 16 pivoted upon fixed shaft 17 and connected with angular lever or finger 18 positioned to engage flapper valve 19 at a point above its pivot 19a. The sensitivity may be altered by pivotally connecting the right-hand end of link 15 at another selected radius on lever 14, only three such radii being shown, for purposes of illustration. However, the much wider range of sensitivity required in practice may be readily obtained by anyone skilled in the art by following the above teaching. Flapper 19 is arranged to control the port of nozzle 20, their arrangement and construction being well known (also see Fig. 4 for details). Nozzle 20 is connected through conduit 21 to T 22 from which runs pipe 23 to the interior of capsule 24 and from which also runs pipe 25 to a compartment in casing 26 of pressure equalizing arrangement 27. Pipe 25 is thus arranged to charge a compressed medium, such as air, into pipes 21 and 23, as will be described more fully hereinbelow.

Capsule 24 is arranged to govern the air pressure upon diaphragm valve 28 controlling flow through conduit 29 which feeds a fluid to, or draws a fluid from, the apparatus under control. This is accomplished by way of relay, or pilot, valve 30 which may comprise ball 30a controlled by stem 31 actuated by capsule 24 and controlling the passage of the compressed medium from pipe 34 (leading to the diaphragm-actuator of valve 28) either to the atmosphere by way of enlarged bore 33 or from supply pipe 32, valve 30 being normally in a throttling position, i. e. partially open with respect to both supply 32 and leak 33.

Pressure equalizer 27 includes lower casing section 26 and upper casing section 35 which are separated by flexible diaphragm 36 which is clamped between the sections so as to seal the interior of the upper compartment of section 26 and to permit the adjustment of valve 43 relative to its seat 42. The interior of section 35 is, however open to the atmosphere, through port 37. Section 26 is divided into two compartments 38 and 39 by web 40 provided with central port 41 having conical valve seat 42 with which correspondingly shaped valve 43 is adapted to cooperate. Valve 43 is held in an operative position and urged towards its closed position by leaf spring 44 which opposes the expansion of expansible capsule 45 disposed within compartment 38 and acting upon valve 43 by stem 46. The latter is of smaller diameter than port 41 to permit fluid to pass from compartment 39 to compartment 38 in any open position of valve 43. It will be understood that suitable perforated guiding means may be provided within bore 41 to guide the movements of stem 46, or preferably, that capsule 45 and spring 44 are cupped, as shown, to respectively retain the end of valve 43 and of its stem 46.

Lowermost compartment 39 of lower casing 26 receives a compressed fluid medium, such as air, under substantially constant pressure, from pipe 47 which is connected therewith and also with T 48, to which pipe 32 is likewise connected, the T being supplied with compressed fluid by pipe 49.

The interior of compartment 38 is connected with the interior of capsule 45 by way of coil 50 of relatively high resistance, the coil being connected with the interior of hollow stem 51 which is welded, soldered, or otherwise connected in gas-tight manner with diaphragm 36 and communicates with the interior of capsule 45. It will be readily understood that connection 50 acts as a high resistance which cooperates with the internal capacity of capsule 45 to slowly establish pressure equilibrium between compartment 38 and the interior of capsule 45.

The position of capsule 45, and hence the normal position of valve 43, can be controlled by means of manually manipulatable screw 52 which passes through the wall of casing section 35 and abuttingly engages stem 51. The screw is held in its last-adjusted position by means of lock nut 53.

Screw 52 is initially so adjusted that, for a zero pressure differential between capsule 45 and compartment 38, a relatively small amount of air is permitted to flow past valve 43. This air escapes through nozzle 20 when flapper 19 is in throttling position, i. e. partially open. Any further opening of nozzle 20 by flapper 19 is thus sufficient to cause the leak through the nozzle to exceed this minimum flow past valve 43 and will therefore cause the pressure in line 25 between compartment 38 and nozzle 20 to drop quickly, since at such instant only a relatively small amount of air is passing through valve 43, but the immediate drop in pressure will be relatively small, since capsule 45 immediately expands to further open valve 43 which admits air into line 25 at an initially increased rate.

Thus, it will be seen that nozzle 20 constitutes an air leak and that upon the degree of opening of such nozzle will depend the ultimate pressure in pipe 23 and capsule 24, the value of the pressure on the diaphragm top of valve 28 and the position of such valve. Upon a further opening of the nozzle, there will be a consequent fall in the pressure in compartment 38 relative to that within expansible capsule 45 and an initial expansion of capsule 45 and an initial opening of valve 43 which acts to oppose the fall in pressure in compartment 38. The differential pressure between compartment 38 and capsule 45 will be gradually reduced to zero by way of coil 50 and valve 43 will accordingly be asymptotically restored to that final position of equilibrium which is its normal position.

From the above, it will be clear that, as flapper 19 opens or closes nozzle 20, the following pressure changes will take place in pressure-system 21, 25, 38, 45, 23, and 24. Upon movement of flapper 19 in either direction, a change of pressure will immediately take place within pipes 23 and 25, resulting in the creation of a pressure differential between the interior of compartment 38 and that of capsule 45. This pressure differential will cause an initial movement of valve 43 to assist the pressure in chamber 38 to assume the value required to establish a balance between the flow through valve 43 and that through nozzle 20. To this flow, there will correspond a definite momentary pressure in pipe 23 and capsule 24. A relatively large change in the amount of opening of nozzle 20 will therefore cause an immediate, but small, change of pressure in capsule 24 since the effect of the change in the position of nozzle 20 will be opposed by capsule 45 and its valve 43, capsule 45 acting in a manner to oppose rapid fluctuations in the pressure in lines 23 and 25. Capsule 24 will therefore not assume a position initially corresponding only to the degree of opening of nozzle 20 but assumes one also depending upon the rate of movement of flapper 19.

As the pressure differential between compartment 38 and capsule 45 gradually is reduced to zero by the action of connecting resistance 50, valve 43 moves towards its original position and, if there is no further change in the position of flapper 19, valve 43 will ultimately reach its original or normal position regardless of what the pressure in compartment 38 and capsule 45 may be. It will be obvious that, depending upon whether flapper 19 moves towards the closed position or towards the open position, the pressure in chamber 38 or in capsule 45, respectively, will momentarily be the greater, but ultimately in either case equilibrium will be established by way of coil 50. The resistance of this coil is predetermined to be such that equalization between spaces 38 and 45 always will be considerably slower than the rate of change of pressure in compartment 38 resulting from movement of flapper valve 19 in response to changes in the temperature of the process.

In order to make clear the operation of the mechanism, it will be assumed that flapper valve 19 has been moved from a partially open position to a more fully open position by a corresponding increase in the temperature of the apparatus under control. Such a change will thus necessitate the closing of valve 28 to a greater extent so as to cut down, e. g., the supply of a heating liquid to the regulated process. This result is accomplished automatically in the following manner: the opening of flapper valve 19 reduces the resistance to flow from nozzle 20 and therefore causes a greater discharge of air. This will tend to produce an immediate drop in pressure in conduits 23 and 25. If all of the additional air escaping through the nozzle were supplied through conduit 23, there would be a sudden and rapid deflation of capsule 24 followed by a rapid flow of high pressure air from conduit 32 into conduit 34 and hence sudden and more or less complete closing of valve 28. This sudden action is, however, prevented by the pressure equalizing mechanism housed within the casing 26. Upon a slight drop of pressure within conduit 25 and thus in compartment 38, there is an initial expansion of capsule 45 which causes greater opening of valve 43. Air under pressure thus passes into compartment 38 and by way of pipe 25 to nozzle 20, thus supplying the additional air demanded by the nozzle. The resulting immediate change in the position of ball 30a in pilot valve 30 and hence of the controlled valve 28 is thus relatively small but comparatively rapid. Subsequent to the occurrence of such a sub-pressure in compartment 38, pressure equilibrium begins to be established between compartment 38 and capsule 45 by way of coil 50. The length of time for reaching substantial equilibrium can, of course, be regulated by suitably selecting the resistance of this coil. As the pressure in capsule 45 gradually falls, valve 43 moves towards its partly closed position, i. e. its normal position, thereby reducing the flow of air to the nozzle. This will tend to reduce the pressure in lines 25 and 23 and thus cause greater opening of relay valve 30 and hence the closing of controlled valve 28 to a more nearly closed position. The pressure in line 23 thus gradually approaches the reduced value corresponding to the initial deflection of the flapper 19.

While these pressure changes are occurring, the initial change in the position of valve 28 has already begun to manifest itself in a drop in the temperature of the apparatus under control. This causes gradual contraction of Bourdon tube 11, accompanied by movement of link 15 to the right and, consequently, a closing movement of flapper valve 19 towards its normally partially open position. The resistance to the flow through the nozzle has thus in the meantime been increased and therefore a smaller volume of air is now demanded by the nozzle. The fall in pressure in conduit 23 is thus limited both by the action of valve 43, by the lag of the instrument, and also by the effect of the initial displacement of valve 28. When associated with apparatus which heats up or cools down rapidly, valve 28 will not be moved to the positions corresponding to the extreme positions to which flapper 19 is moved by finger 18; instead valve 28 will be moved only to a smaller degree, and further movement of valve 28 will depend upon whether or not regulation has been restored to the predetermined control point by the initial movement of valve 28. If the control point has not been reached, the pressure in line 23 continues to fall until valve 28 has been throttled to the proper degree and the flow through such valve corresponds to the demands of the apparatus under control.

It will be recognized that the novel air-supply governing system 43, 38, 50, and 45 constitutes a delayed action device 27 and in part corresponds to an air-supply tank of large capacity which operates to damp pressure fluctuations in line 23, preventing either rapid rise or rapid fall of pressure in such line. In another embodiment of my invention, as shown in Fig. 3, such a governing means so operates that the adjustment of the steam valve or other control valve is delayed by means of a compressed-air tank of relatively large capacity arranged in series between resistance coils, the tank and coils being in parallel with pilot valve and its capsule, or equivalent, actuating mechanism, a common air supply feeding the pilot valve and the parallel system connected with the line leading to the nozzle. I propose to claim both the several embodiments of the invention described herein and also the invention broadly.

From the above, it will be seen that I have provided a device wherein the initial impulse is, so to speak, damped by valve mechanism 27, only a reduced impulse being initially transmitted to valve 28, and further adjustment of valve 28 being delayed until equilibrium is established between compartment 38 and capsule 45.

Résumé of operation, Figure 1

In résumé, the operation of the mechanism shown in Fig. 1 is as follows: let it be assumed that the temperature setting is 150° F., the controller having a range of 0–200° F. and that the apparatus heats up from atmospheric temperature. Diaphragm valve 28 is a direct-acting valve, that is, an increase of the pressure on its top is required to close it, and when the instrument is set into operation valve 28 is initially wide open, pilot air valve 30 sealing off the air supply to the diaphragm valve.

The pressure in the entire governing system is 18 lbs., that of the supply, since the flapper valve is closed. When the temperature in the apparatus under control approaches 150° F., finger 18 will engage the flapper valve and open the nozzle to a slight extent. The pre-set opening of valve 43 is so small that only a slight opening of nozzle 20 will pass all the air that can flow through the valve. The first movement of the flapper valve will partially vent the air from chamber 38, pipes 25 and 23, and capsule 24, thereby reducing the pressure in the governing system so that pilot valve 30 permits air to flow from pipe 32 to diaphragm valve 28 which then moves a short distance towards its closed position. The pressure drop in the governing system will, however, be of only short duration because, as the pressure in chamber 38 drops, the greater pressure inside of bellows 45, being at 18 lbs., will cause the bellows to expand and open valve 43 to a greater extent, thereby admitting more air at 18 lbs. to the system. The pressure of the air in the system will not, however, reach 18 lbs. because flapper 19 is still open. During this period, the pressures in chamber 38 and bellows 45 have tended towards equalization by way of coil 50 which connects the two. These pressures will become substantially equal after which the flapper starts to return to its original position (i. e. when it starts to shut nozzle 20) or by transfer through coil 50. When the pressures reach equilibrium, valve 43 will have returned to its original position, the amount of air passing therethrough being then equal to the amount escaping through the nozzle. However, these pressures will be different from their earlier values, assuming that the change in the heating load persists and the flapper will be nearly, but not exactly, at its earlier position.

It will be seen that the maximum effect exerted upon the diaphragm motor valve is that corresponding to the opening of the valve 19—20 but that this effect is delayed for a length of time which depends upon the resistance of coil 50. By increasing the resistance of this coil, the correcting action upon the diaphragm valve is further delayed, and vice-versa.

Figure 2

The device shown in Fig. 2 is generally as in Fig. 1. However, unsymmetrical damping valve 43 has been replaced by symmetrical damping valve 54, and valve port 41 and its seat 42 have been replaced by frusto-conical passages 55 and 56; also stem 57 of valve 54 has a wedge-shaped portion with which cooperates rider 59 of flapper 60 which is pivotally connected by pivot 61 and counter-weighted by weight 62 on valve crank arm 63 of flapper 60. Pivot 61 is on lever 64 to which has attached clamping index 65 having locking screw 66 therefor. Flapper 60 is disposed adjacent nozzle 20 which is connected generally as before with the pressure system by line 21. Link 67 is of fixed length and connects lever 14 with pen arm lever 68 which carries a graduated scale 69 with which clamping index 65 cooperates. The depending stem 57 of valve 54 is sealed against pressure by stuffing box gasket 70.

Operation, Figure 2

Starting with a steady condition in which the regulated temperature is that set at index 65 on scale 69, the same pressure exists in capsule 45 and its surrounding chamber 38 with the result that damping valve 54 is in the narrowest portion defined by the junction of conical passages 55 and 56, in which position there is a slight opening around damping valve 54. There is only a small opening between flapper 60 and nozzle 20 when regulating at the set temperature. The opening around valve 54 supplies nozzle 20 with just enough air to maintain the pressure in lines 21 and 25 and in line 23 to capsule 24 so that pilot valve 30 is normally partially open and with ball 30a in a throttling position to admit just the same amount of air as escapes through the leak between its stem 31 and its hole 33, the result being that constant pressure is maintained in line 34 to the top of direct-acting diaphragm valve 28 on line 29 to maintain a constant input rate of heating fluid through line 29 to the process to maintain a substantially constant temperature at the point where bulb 13 is located.

With a decreasing temperature, as resulting from a sudden slight increase in the heating load, the upper end of lever 14 moves to the right, thus moving flapper 60 closer to its nozzle 20, and consequently rapidly increasing the pressure in chamber 38 above that in capsule 45. The pressure also increases rapidly in capsule 24 thus lowering the position of ball 30a in pilot valve 30 and thus lowering the pressure on line 34 to the diaphragm top of the valve 28 which then opens slightly. This increases the heat input and thus tends to offset the temperature drop. However, since this is a corresponding type of regulator which controls within a throttling band that varies in width inversely with the overall sensitivity of the regulator, the final temperature will remain slightly below that set by a small amount of "drift" until the heating load is again at the value corresponding with the temperature setting.

This initial response does two things: it opens valve 54 to increase the flow, and it simultaneously moves flapper 60 away from nozzle 20, rider 59 following the wedge cam 58 away from its mid-portion. The net effect of the increased flow around valve 54 and past flapper 60 is to increase the speed of response of the pressure in capsule 24 and at the same time to decrease the effective sensitivity of the regulator, a momentary decrease in sensitivity following a change of the regulated variable being a powerful producer of stability. The restoration of equality of pressures in chamber 38 and capsule 45 is as before described under Fig. 1. A chief difference between the devices of Figs. 2 and 1 is that valve 54 in Fig. 2 acts to lower the sensitivity in a symmetrical manner upon a change in either direction from a steady regulating value while valve 43 of Fig. 1 has a sometimes objectionable increase of sensitivity upon a closing movement of flapper 19 although the sensitivity decreases momentarily, as is usually desired, upon a momentary departure of flapper 19 from its nozzle 20, the action in general, providing an advantageous mode of control. While the device of Fig. 2 does not operate to give ultimate reset, i. e. to reduce the throttling range to a mere point, still, by shaping the cam 58 as described and shown herein, there is obtained a regulator which operates, in general, stably for a given high sensitivity. In general, this type of regulator provides a useful mode of regulation for many applications, e. g. level, pressure and temperature control in the oil refining and other process industries. In a sense, the device of Fig. 2 regeneratively compounds the effects of the rate of departure.

*Figure 3*

The device of Fig. 3 is generally as in Fig. 1 except that damping means 27, which has a valve 43 movable by a capsule 45 in Fig. 1, has been replaced by damping means 27" having no mechanical moving parts. Damping means 27" comprises high resistance 72, capacity tank 73 and low resistance 74 connected in series between T's 22 and 48. In parallel with damping means 27" between such T's are line 32 to pilot valve 30 and line 23 to capsule 24 which positions pilot valve 30. The relative proportions of the elements of the damping means are indicated by the following which operated successfully in an experimental installation: tank 73 had a capacity of approximately one gallon, high resistance 72 passed 100 cubic centimeters of air in 30 seconds from 10 pounds pressure to atmospheric, while low resistance 74 requires only 5 seconds under similar condition.

*Operation, Figure 3*

Assume that, following a period during which equilibrium has been attained, there occurs a sudden decrease in the heating load and a resultant constant initial rate of rise of the temperature and consequent constant initial rate of movement of flapper 19 away from its nozzle 20. The pressure in capsule 24, which governs the actuation of valve 28, would drop to a value corresponding with the opening of flapper 19 if tank 73 had negligible capacity, in which case the action of valve 28 would cause the temperature at bulb 13, and the corresponding position of flapper 19, to gradually approach a new steady value not far removed from that for the setting point with any regulator of reasonably high-sensitivity. The effect of a tank 73 of appreciable capacity is seen to be two-fold: Upon a rising temperature it initially acts to give a higher pressure in capsule 24 than would otherwise be the case, with the result that the initial movement of valve 28 is smaller than would otherwise be the case, after which initial action, such pressure asymptotically paces the approach of the temperature to its new steady value while the pressure in capacity tank 73 and the temperature in the process are both approaching equilibrium. In other words, the sensitivity is initially decreased following a change and then gradually increased to its normal value.

This regulator is seen to have a symmetrical action upon either an increase or decrease of temperature and to have only such momentary shifting of the control point as contributes to stability. This device is of unparalleled simplicity in its construction and constitutes the preferred embodiment of the present invention. Further it is a simple matter to alter the capacity of tank 73 without changing tank 73 itself, as e. g. by partially filling with liquid as shown. It is also easy to alter the resistances 72 and 74 as may be required to meet the particular requirements of a given application. In general, however, it is desirable to have resistance 72 considerably greater than that of resistance 74 and the capacity of tank 73 considerably larger than the total capacity of the pressure system comprising line 21, T 22, line 23, and capsule 24; line 23 being, moreover, of sufficient size that pressure changes are promptly communicated thereby from T 22 to capsule 24, and line 21 being large enough that, due to the flow therethrough from T 22 to nozzle 20, the pressure drop is slight.

It will be seen that while the embodiments of Figs. 1 and 2 are both adequate and compact and consequently generally of a nature more commercially attractive than of that of Fig. 3, still the extreme simplicity and effectiveness of the less-compact embodiment of Fig. 3 is likely to be preferred by experienced instrument users who have come to properly associate simplicity with low maintenance cost and to associate elimination of mechanical friction and lost motion with reliable and close regulation.

*Figure 4*

Fig. 4 shows the details of flapper 19 and nozzle 20 which, while conventional, still should be clearly shown for the fuller comprehension of the invention. Nozzle 20 is seen to be of considerably smaller diameter than that of line 21, and flapper 19 is seen to be pivotally mounted upon pivot 19a so as to give a somewhat sliding cut-off and self-cleaning action. The counterweight shown attached to flapper 19 exerts sufficient torque to close flapper 19 tight against nozzle 20 even though the full air-supply pressure, of say 18 pounds per square inch, be in line 21 to nozzle 20.

Referring to Fig. 1, the whole regulator for a variable (temperature) comprises a controller (valve 28) for the variable (indirectly by controlling the fuel flow through line 29) in accordance with the value sensed by a meter (elements 11—18) as governed by a damped pressure-system (including elements 19—26 and diaphragm 45 with its series resistor 50), the pressure in such system governing the servo-operated control valve 28 by pressure-responsive bellows 24 which actuates pilot valve 30a to correspondingly position the spring-opposed diaphragm-top motor for valve 28.

The terms and expressions which I have employed are used in the specification as terms of description and not of limitation, and I have no intention, in the use of such terms and expressions in the claims, of excluding any equivalents of the features shown and described or portions thereof, but recognize that various modifications, which are operated by air or other fluid including electricity when it acts as a fluid but which excludes purely kinetic devices, are possible within the scope of the invention claimed. While "capacity" and "resistance" have been used loosely in a customary sense elsewhere in the specification respectively for an element, such as e. g. capsule 45 in Fig. 1, having capacity and one, such as coil 50, having resistance, the terms "capacitor" and "resistor" are respectively used in their stead in the claims following the accepted electrical terminology.

I claim:

1. In a regulator for a physical variable such as temperature, pressure or the like having a meter sensitive to said variable and a final control valve affecting said variable, the combination with said meter and valve of a pneumatic governing system comprising an air supply control valve, a separate air leak control valve, a conduit connecting said control valves, said meter for said variable being operatively connected to said leak control valve to position only such valve in correspondence with the measured value of said variable, and means connected to said conduit and operatively connected to said supply control valve to position only such valve in response to only the rate of change of pressure in said conduit and including a capacitor, a resistor connecting said capacitor to said conduit, and an actuator for said supply control valve sensitive to the difference in pressure between the interiors of said capacitor and said conduit; and means connected to said conduit and sensitive to the air pressure therein for governing the position of said final control valve in accordance with the value of the air pressure in said conduit.

2. The combination set forth in claim 1 in which the first named means includes a chamber whose interior is connected to said conduit, said capacitor comprising a capsule within said chamber, and said resistor connecting the interiors of said chamber and capsule, said capsule being operatively connected to said supply control valve to position such valve in correspondence with the difference of pressure between the interiors of said capsule and said chamber.

3. The combination set forth in claim 1 in which the last named means includes an element connected to said conduit and a portion positioned in correspondence with the value of the pressure in said conduit, such portion being operatively connected to the final control valve to govern the positioning of such valve in correspondence with the position of said portion of said element.

4. In a regulator for a physical variable, the combination of a governing system including a pressure-fluid conduit whose pressure governs the stated regulation, a means for affecting the flow of the pressure fluid relative to said conduit positioned in correspondence with the regulated variable for ultimately correspondingly varying the pressure in said conduit, and a separate means for affecting the flow of the pressure fluid relative to said conduit and connected with said conduit and whose position is changed in accordance only to the rate of change of pressure in said conduit and operatively connected to said conduit to continuously damp the stated variations of said pressure in said conduit.

5. In a regulator for a physical variable, the combination of a governing system including a pressure-fluid conduit whose pressure governs the stated regulation and separate leak and fluid-supply controllers for said conduit, means for positioning one of said controllers in correspondence with the regulated variable to vary the pressure in said conduit in ultimate correspondence with any steady position of said means, and means for positioning the other of said controllers in substantial correspondence with the rate of the stated variation of such pressure to damp such variation.

6. In a regulator for a physical variable, the combination of a governing system including a pressure-fluid conduit whose pressure governs the stated regulation, separately variable leak and fluid-supply controllers for said conduit, means for operating one of said controllers in correspondence with the regulated variable to vary the pressure in said conduit, and means sensitive to the pressure in said conduit for operating the other of said controllers in correspondence with a time-function of such pressure to damp such pressure variation.

7. A regulator for a physical variable comprising, in combination, a device sensitive to the variable and having a portion positioned in correspondence with the sensed value of the variable; a governing system including a condition-throttling portion positioned by the stated portion of said device to modify a physical condition of the system to bring the value of such condition into ultimate correspondence with the stated value of the variable, and a means including a valve movably sensitive to such condition and continuously effective to only temporarily modify the value of such condition upon a change thereof resulting from a change of the variable and only in accordance with the rate of change of such condition; means for controlling the variable; and a servomotor system including a motor for positioning the controlling means in continuous correspondence with a physical condition of the servomotor system, and a throttling relay for the servomotor system responsive to the stated condition of the governing system to maintain the values of the stated conditions of both of said systems in continuous correspondence.

8. In a regulator for a physical variable such as temperature, pressure or the like measured by a meter by positioning a final control valve affecting said variable, the combination with said meter and said valve of a pneumatic governing system including two air flow control means, of which one is an air control valve, and a conduit connecting said control means, said meter for said variable being operatively connected only to said air control valve to position the latter in accordance with the value of said variable and the other of said control means being continuously effective to control only the air supply in response to the rate of change of pressure in said conduit to damp such changes and including a capacitor and a resistor connecting the interior of said capacitor with that of said conduit; and means for positioning said final control valve in correspondence with the value of the pressure in said conduit.

9. A regulator for a physical variable having a fluid system including a source of fluid supply comprising the combination with the system of a leak control valve connected with said system, means positioning said valve in correspondence with the value of the variable to accordingly alter the rate of fluid leakage from the system, a controller for the variable governed by the pressure in the system, and means sensitive to changes in said pressure for operatively connecting the source of fluid supply with the system to only temporarily modify the rate of supplying fluid to the system to damp pressure changes in the system and including a capacitor and a resistor connected to said capacitor, at least a portion of said resistor being connected with both said capacitor and with said system.

10. In a regulator for a physical variable, the combination of a leak controller positioned in correspondence with the regulated variable only, a pressure-responsive means for governing the stated regulation only, a pressure system connecting them to have said pressure vary with the position of said leak controller, a line for supplying fluid to said system, and means effective to damp changes in said pressure in response to such changes only, said means including a fluid-conveying portion which constitutes the sole connection of the supply line with said pressure system.

11. A regulator for a physical variable comprising in combination, a meter for said variable; a pressure system including a fluid supply, a fluid leak separate from said fluid supply and controlled by said meter, and a conduit connecting said supply with said leak; means for controlling said variable positioned in correspondence with the pressure in said conduit; means operated by said meter to vary said leak in correspondence with the measured value of said variable; and means responsive to a variation of said pressure and continuously effective to momentarily alter said supply in pressure-damping direction upon a variation of the leak and to gradually thereafter return said supply to a steady value until the next variation of said pressure.

12. The combination set forth in claim 1 in which said supply control valve is symmetrical for changes of pressure in each of opposite directions and is operatively connected with said leak control valve to symmetrically open said leak control valve with said supply control valve for movements of said supply control valve in each of opposite directions, whereby the responsiveness of the governing system is increased and the sensitivity of regulation is decreased immediately following a sudden change of the regulated variable.

13. In combination, a fluid-type governing system for regulating the value of a variable, a symmetrical fluid supply valve normally in its most nearly closed position, a chamber, a capsule within said chamber and operatively connected with said valve to position said valve, and a resistor connecting the interior of said capsule with that of said chamber, said valve being positioned by said capsule; and a leak controller normally positioned in correspondence with the regulated variable and operatively connected with said capsule to be substantially symmetrically affected as to position by departures from the normal position of said capsule.

14. The steps in the method of regulating a physical variable by controlling the variable in accordance with the pressure in a fluid system having a fluid supply valve and a fluid leak valve which comprise maintaining the position of said leak valve in correspondence with the regulated variable, and modifying the position of the supply valve to increase the responsiveness and to decrease the sensitivity of the pressure change to a sudden change of the regulated variable in either direction and in accordance with the scalar value of the resultant sudden change of pressure.

15. In combination, a fluid-type system for governing the positioning of a final element in correspondence with the value of a measured variable in accordance with the pressure in the system, a leak controller for said system positioned in correspondence with the measured variable, a fluid supply valve for said system, a chamber and a capsule in said chamber in said system downstream of said fluid supply valve and upstream of said leak controller, said supply valve being positioned by said capsule, and a resistor connecting the interior of said capsule with that of said chamber.

16. A regulator for a physical variable comprising a fluid-type governing system having a leak controller therefor corresponding in position with the regulated variable, a fluid supply valve for said system, a chamber and a capsule in said chamber in said system downstream of said fluid supply valve and upstream of said leak controller, and a resistor connecting the interior of said capsule with that of said chamber, such supply valve being positioned by said capsule; and controlling means for the regulated variable governed by the pressure in said system.

17. A device sensitive to a physical variable comprising, in combination, a fluid system, a controller for the variable connected with the system and movably operative in accordance with the pressure therein, and two separate unidirectional-flow throttling means connected to the fluid system and continuously effective to alter the pressure in such system, one of said throttling means being a leak valve and the other being a supply valve for said fluid system, one of said means being movably sensitive to the sensed variable and the other being movably sensitive to the fluid in the system and movably operative only in accordance with the rate of change of the pressure which is caused by the operation of one of said valves.

18. The steps in the method of regulating a physical variable by controlling the variable in accordance with the pressure in a fluid system having two adjustable orifices which comprise altering the opening of one orifice in accordance with the value of the variable upon a change of said variable, and continuously maintaining the opening of the other orifice in correspondence with the integrated rate of change of the pressure which is caused by the operation of the other orifice.

19. In a regulator, including a meter, for a measured physical variable such as temperature, pressure or the like by positioning a final control valve affecting said variable, the combination with said meter and said valve of a pneumatic governing system including an air supply control means, an air leak control valve, and a conduit connecting said control means with said control valve; said meter for said variable being operatively connected to said leak control valve to position the latter in correspondence with the measured value of said variable; said fluid supply control means being effective to affect the air supply rate in response to the rate of change of pressure in said conduit and including a resistor and an associated capacitor, said resistor connecting an air supply for said system under substantially constant pressure with said conduit and having at least a portion of said resistor located between said capacitor and said conduit; and means for governing the position of said final control valve in correspondence with the pressure in said conduit.

20. In combination, a fluid-type governing system for a physical variable regulated in accordance with the pressure in said system; a leak controller for said system positioned in correspondence with a physical variable; a fluid supply for said system under substantially constant pressure and a resistor of high resistance to flow through it, a resistor having relatively low resistance to flow through it, a capacitor connected to both resistors, said resistors being in series in the stated order along the direction of flow and constituting the sole connection of said supply with said system.

PAUL F. K. ERBGUTH.